Aug. 9, 1927.
J. J. WALSH
1,638,672
COMBINED HAND MIRROR AND TABLE MIRROR
Filed Jan. 20, 1927
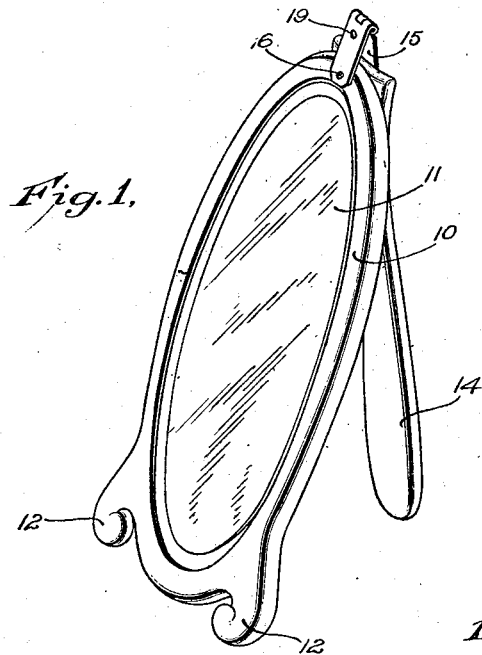
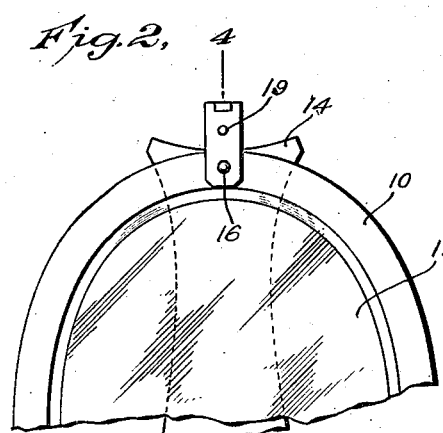
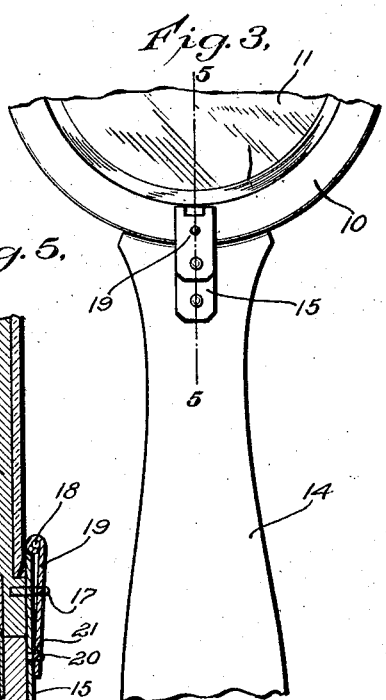
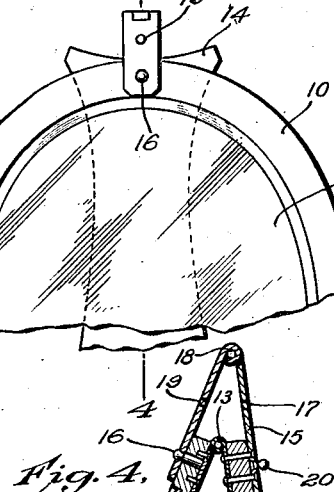
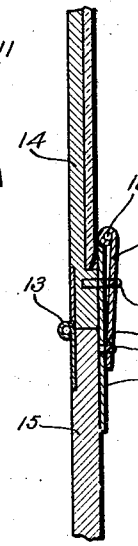
INVENTOR
JOHN J. WALSH
BY
ATTORNEY
WITNESSES Patented Aug. 9, 1927.

1,638,672

UNITED STATES PATENT OFFICE.

JOHN J. WALSH, OF YONKERS, NEW YORK.

COMBINED HAND MIRROR AND TABLE MIRROR.

Application filed January 20, 1927. Serial No. 162,346.

The present invention is concerned with the provision of a unique type of mirror which may serve either as a hand mirror or as a table mirror, and which may be compactly folded for purposes of transportation.

The ordinary type of hand mirror includes the frame portion rigidly connected to a handle. This type of mirror, while still used to a certain extent, is being in large measure superseded by the so-called table mirrors which are self-supporting, being provided with easels or equivalent supporting means. The present mode of wearing bobbed hair is largely responsible for the present increased demand for table mirrors, because most women find it essential that both hands be free for adjusting the hair.

The present invention combines all of the advantages of both types of mirrors by the provision of a device in which a handle portion may be rigidly coupled to the frame portion to define a handle, or may be locked in folded position to constitute an easel for supporting the frame upon a table.

Other objects of the invention are to provide a mirror of the general character described above which will be of simple, practical construction, neat and attractive appearance, and capable of rapid adjustment to convert it from a hand mirror into a table mirror or vice versa.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a perspective view of my improved mirror in proper position for use on a table.

Fig. 2 is an enlarged fragmentary front elevational view thereof.

Fig. 3 is an inverted view of Fig. 2, but showing the device folded for forming a hand mirror.

Figs. 4 and 5 are longitudinal sectional views taken on the lines 4—4 and 5—5 respectively of Figs. 2 and 3.

The mirror includes a frame 10 mounting the reflecting glass 11. The frame 10 may be of any desired shape, although I have shown it as following the usual conventional oval, but provided with laterally extending feet portions 12 upon which it rests when supported on a table. Pivotally connected to the frame 10 as by a hinge 13 is a handle portion 14 adapted to serve the additional function of an easel as shown in Fig. 1.

Means is provided for selectively locking the handle 14 either in the position of Fig. 1 or the position of Fig. 3. The means which I prefer to utilize for the purpose includes a plate 15 riveted or otherwise secured to the top of the handle and projecting therebeyond, so that it overlies the edge of the frame 10 when the handle is in the position of Fig. 3. A stud or tit 16 carried by the frame 10 is adapted to snap into an opening 17 in the free end of the plate 15 as the sections 10 and 14 are swung into alignment, thereby preventing the frame 10 from swinging on the hinge 13.

Pivotally connected as at 18 to the free end of the plate 17 is a plate or flap 19. With the device in the position of Figs. 3 and 5, this flap is held in inoperative position against the plate 15 due to the engagement of a stud 20 on the plate 15 in an opening 21 of the flap. When it is desired to use the handle as an easel however, stud 16 is disengaged from the opening 17, and the flap 19 swung over to engage the opening 21 with the stud 16 as seen in Fig. 4. With the parts in this position, further pivotal movement of handle 14 on frame 10 about the hinge 13 is prevented by the rigid V-brace defined by the plates 15 and 19.

It will be evident that the handle and mirror might be moved to completely folded position by disengaging the stud 16 from the opening 20. It is also evident that the corner pieces or feet 12 of the mirror simply represent some means of preventing the mirror from rocking laterally when supported on a table with the aid of the handle.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A mirror, a handle pivoted thereto, means for locking the handle against pivotal movement when it is axially aligned with the mirror, or when it is disposed at an acute angle relatively to the mirror whereby the handle may selectively serve as an easel, the locking means including a stiff strip fixedly attached to the handle and normally overlying and latched to the mirror, and a second strip pivoted to the free end of the first strip and adapted to be latched to the mirror when the mirror and handle define an acute angle.

2. A mirror, a handle pivoted thereto, means for locking the handle against pivotal movement when it is axially aligned with the mirror, or when it is disposed at an acute angle relatively to the mirror whereby the handle may selectively serve as an easel, the locking means including a stiff strip fixedly attached to the handle and normally overlying and latched to the mirror, and a second strip pivoted to the free end of the first strip and adapted to be latched to the mirror when the mirror and handle define an acute angle, the mirror carrying a stud snapping selectively into openings in one or the other of the strips and constituting the latch means.

3. A mirror, a handle pivoted thereto, means for locking the handle against pivotal movement when it is axially aligned with the mirror, or when it is disposed at an acute angle relatively to the mirror whereby the handle may selectively serve as an easel, the locking means including a stiff strip fixedly attached to the handle and normally overlying and latched to the mirror, and a second strip pivoted to the free end of the first strip and adapted to be latched to the mirror when the mirror and handle define an acute angle, the mirror carrying a stud snapping selectively into openings in one or the other of the strips and constituting the latch means, the fixed strip carrying a stud adapted to enter the opening in the pivoted strip when the latter is disengaged from the mirror.

JOHN J. WALSH.